(12) United States Patent  
Rusch et al.

(10) Patent No.: US 8,730,651 B2
(45) Date of Patent: May 20, 2014

(54) CROSS BUS MAIN DEVICE

(75) Inventors: Brian J. Rusch, Suwanee, GA (US); Arthur Kevin Shumate, Duluth, GA (US); Gustavo Cortes Rico, Duluth, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 275 days.

(21) Appl. No.: 13/432,146

(22) Filed: Mar. 28, 2012

(65) Prior Publication Data

US 2013/0258558 A1 Oct. 3, 2013

(51) Int. Cl.
*H02B 1/04* (2006.01)
(52) U.S. Cl.
USPC ........... 361/634; 361/627; 361/628; 361/631; 361/637; 361/639
(58) Field of Classification Search
None
See application file for complete search history.

(56) References Cited

U.S. PATENT DOCUMENTS

| | | | | |
|---|---|---|---|---|
| 6,111,745 A | * | 8/2000 | Wilkie et al. | 361/605 |
| 6,381,122 B2 | * | 4/2002 | Wagener | 361/611 |
| 6,934,147 B2 | * | 8/2005 | Miller et al. | 361/611 |
| 7,173,811 B2 | * | 2/2007 | Abrahamsen et al. | 361/652 |
| 7,558,053 B2 | * | 7/2009 | Moore et al. | 361/611 |
| 7,616,431 B2 | * | 11/2009 | Moore et al. | 361/611 |
| 8,420,935 B2 | * | 4/2013 | Malkowski et al. | 174/72 B |

* cited by examiner

*Primary Examiner* — Boris Chervinsky (57) ABSTRACT

A device for disconnecting electrical power from a first stack of meter modules, wherein the power is supplied by a main box that also supplies power to a second stack of meter modules. The device includes an incoming bus section for receiving power from the main box and an outgoing bus section for feeding power to the first stack of modules. In addition, the device includes a cross bus device connected to the incoming and outgoing bus sections and a circuit breaker connected to the cross bus device. When the circuit breaker is closed, power is supplied to the first and second stacks of modules. When the circuit breaker is opened, power to the first stack of modules is disconnected while power to the second stack of modules is maintained.

20 Claims, 7 Drawing Sheets

CROSS BUS MAIN DEVICE

FIELD OF THE INVENTION

This invention relates to an electrical distribution system for a building, and more particularly, to a cross bus main device that includes a cross bus connected to a circuit breaker to form incoming and outgoing bus connections on both sides of the circuit breaker,

BACKGROUND OF THE INVENTION

Figure 1:
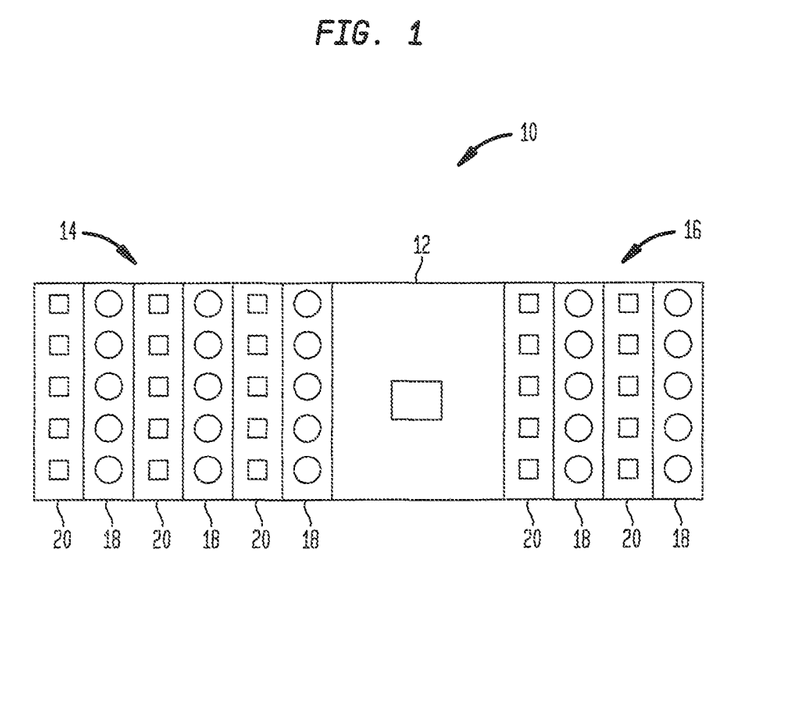
FIG. 1 shows a conventional modular metering arrangement.

A modular metering arrangement is frequently used to supply electrical power to buildings having multiple units such as a multi-family dwelling. Referring to FIG. 1, a conventional modular metering arrangement 10 includes a main circuit breaker located in a main box 12 positioned between first 14 and second 16 banks of meter modules that include one or more stacks of meter sockets 18. Modules may be added to or removed from the first 14 and second 16 banks of modules as needed to accommodate a particular building. A cross bus located in the main box 12 provides current to each module. Each meter socket 18 is electrically connected to a building unit and is adapted to receive a metering device used to determine how much electricity has been consumed in the associated building unit for billing purposes, for example. A circuit breaker is associated with each meter socket 18. Electrical power to individual building units may be connected or disconnected by closing or opening an associated circuit breaker by actuating an associated breaker handle 20.

The main box 12 is connected to an electrical power distribution system. When the main breaker is closed, power is fed from the main breaker to both the first 14 and second 16 banks of modules via the cross bus and ultimately to the building units. When the main breaker is opened, power to both the first 14 and 16 second banks of modules is interrupted.

SUMMARY OF THE INVENTION

A device is disclosed for disconnecting electrical power from a first stack of meter modules, wherein the power is supplied by a main box that also supplies power to a second stack of meter modules. The device includes an incoming bus section for receiving power from the main box and an outgoing bus section for feeding power to the first stack of modules. In addition, the device includes a cross bus device connected to the incoming and outgoing bus sections and a circuit breaker connected to the cross bus device. When the circuit breaker is closed, power is supplied to the first and second stacks of modules. When the circuit breaker is opened, power to the first stack of modules is disconnected while power to the second stack of modules is maintained.

DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In the description below, like reference numerals and labels are used to describe the same, similar or corresponding parts in the several views of FIGS. 2-7.

Figure 2:
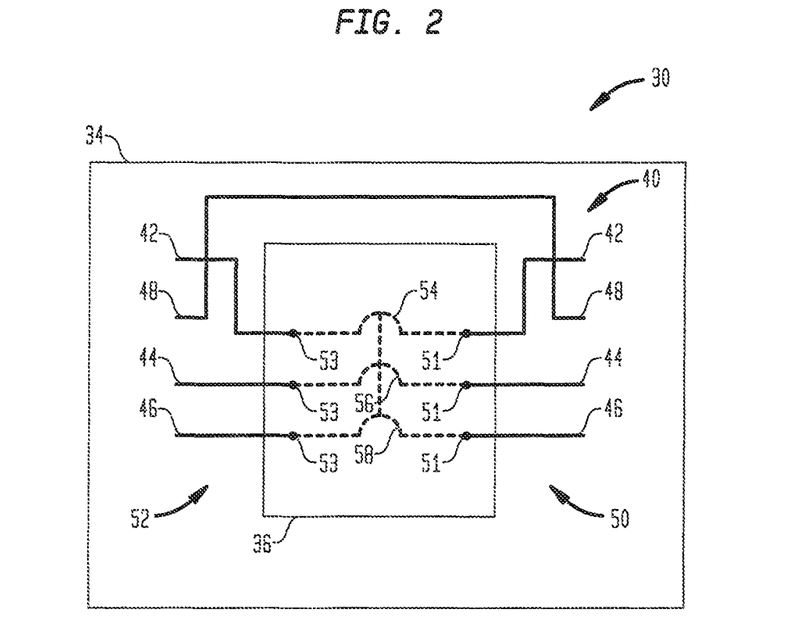
FIG. 2 is a schematic view of a cross bus main device.

The current invention allows electrical power to be disconnected from a first bank of meter modules while maintaining power to another bank of meter modules in a modular metering arrangement so that power to an entire building is not cut off during activities which require that power to only certain areas of a building be disconnected. Referring to FIG. 2, a schematic view of a cross bus main device 30 in accordance with the present invention is shown. The device 30 includes a three pole circuit breaker 36 located in an enclosure 34 (see FIG. 3a). First 42, second 44 and third 46 bus conductors are split to form an incoming bus section 50 and an outgoing bus section 52. The first 42, second 44 and third 46 bus conductors of incoming bus section 50 are connected to line side terminals 51 of first 54, second 56 and third 58 poles of the circuit breaker 36, respectively. In addition, the first 42, second 44 and third 46 bus conductors of the outgoing bus section 52 are connected to load side terminals 53 of the first 54, second 56 and third 58 poles of circuit breaker 36, respectively. Thus, the incoming 50 and outgoing 52 bus sections result in a bus connection on both sides of the circuit breaker 36 to form a bus-in/bus-out system. A fourth bus conductor 48, which is a neutral bus conductor, is not split and bypasses the circuit breaker 36. The first 54, second 56 and third 58 poles are mechanically interlocked on the circuit breaker 36 so that actuation of a breaker handle 44 (see FIG. 3b) simultaneously disconnects each layer 42,44,46 of the incoming bus section 50 from each layer 42,44,46 of the outgoing bus section 52.

Figure 3A:
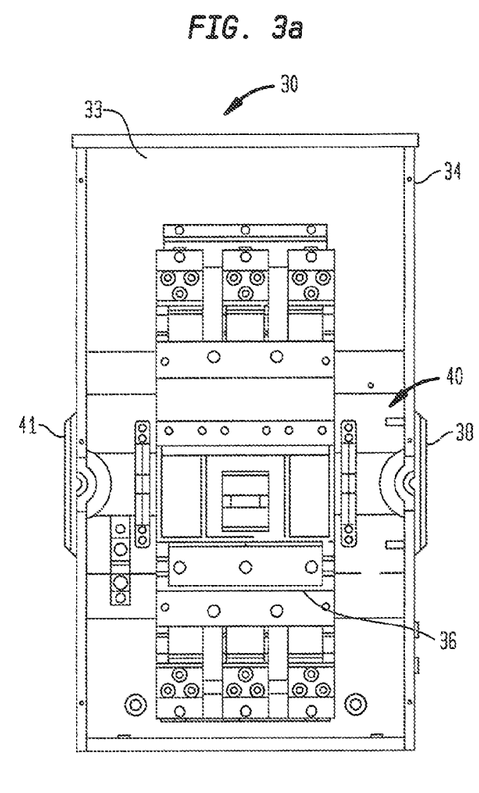
FIGS. 3a-3b depict front and side views of the cross bus main device.
Figure 3B:
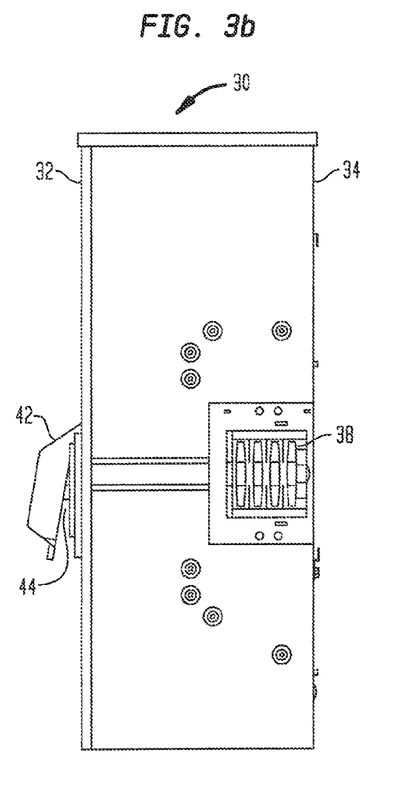

Referring to FIGS. 3a-3b, front and side views, respectively, of the device 30 are shown. In FIG. 3a, a front cover 32 of the enclosure 34 for the device 30 is not shown for illustrative purposes. An interior 33 of the enclosure 34 includes the circuit breaker 36 and first 38 and second 41 connectors. The enclosure 34 also includes a cross bus 40 as will be described. The circuit breaker 36 may be opened or closed by opening a cover 42 and actuating the breaker handle 44.

Figure 4:
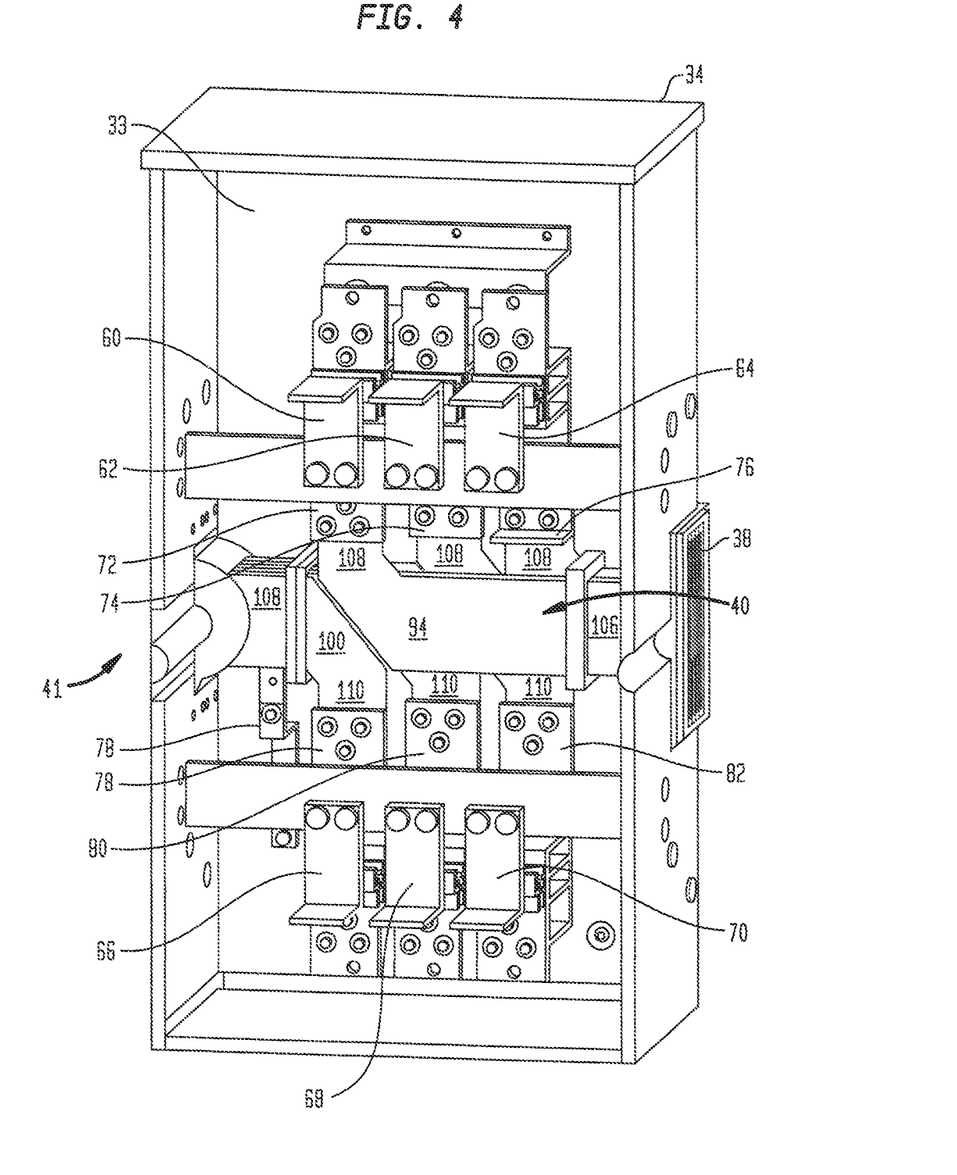
FIG. 4 is view of the interior of the cross bus main device with a circuit breaker removed.

Referring, to FIG. 4, the enclosure interior 33 is shown with the circuit breaker 36 removed. The line side terminals 51 of the first 54, second 56 and third 58 poles of circuit breaker 36 are connected to first 60, second 62 and third 64 upper straps, respectively. The load side 53 terminals of the first 54, second 56 and third 58 poles are connected to first 66, second 68 and third 70 lower straps, respectively. The upper straps 60,62,64 are connected to the cross bus 40 by first 72, second 74 and third 76 upper conductive pathways, respectively. The lower straps 66,68,70 are connected to the cross bus 40 by first 78, second 80 and third 82 lower conductive pathways, respectively.

Figure 5:
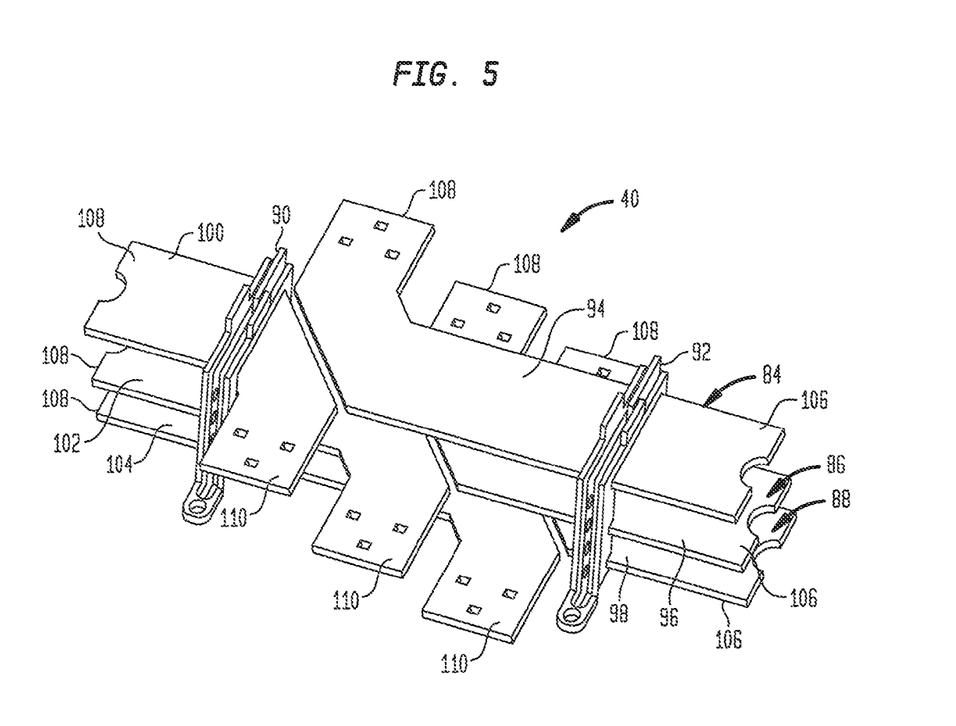
FIG. 5 is a perspective view of a cross bus in accordance with the invention.
Figure 6A:
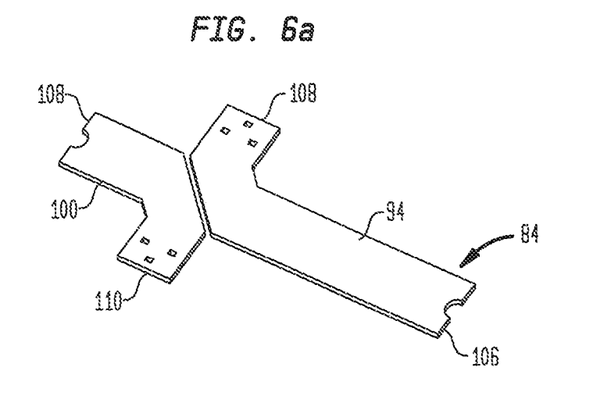
FIGS. 6a-6c depict first, second and third conductive layers, respectively of the cross bus.
Figure 6B:
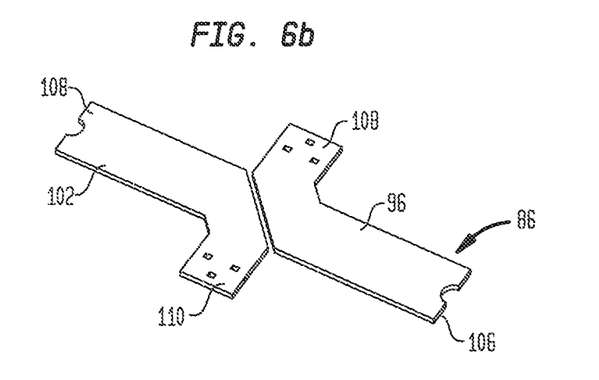
Figure 6C:
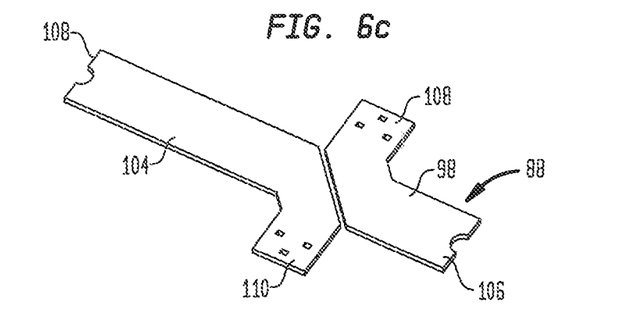

Referring to FIG. 5, a perspective view of the cross bus 40 is shown. The cross bus 40 includes an assembly of first 84, second 86 and third 88 conductive layers. The conductive layers 84,88,86 are held in a spaced apart manner by first 90 and second 92 brackets which are fastened to the enclosure interior 33. FIGS. 6a-6c individually depict the first 84, second 86 and third 88 conductive layers, respectively. Each conductive layer 84,86,88 is fabricated from aluminum, copper or other conductive material and is approximately 3.5 in. by 0.25 in. In a conventional cross bus, conductive layers follow a direct path from one side of an enclosure to another side of the enclosure. In accordance with the invention, the first 84, second 86 and third 88 conductive layers are each split to form first 94, second 96 and third 98 incoming and first 100, second 102 and third 104 outgoing bus layers, respectively. The incoming bus layers 94,96,98 each include a first connector end 106 and a upper pathway end 108. The outgoing bus layers 100,102,104 each include a second connector end 108 and a lower pathway end 110. Referring to FIGS. 5, 6a-6c and 4, the upper pathways ends 108 are each directed upward and are connected to the first 72, second 74 and third 76 upper conductive pathways, respectively. The first connector ends 106 terminate at the first connector 38. The lower pathway ends 110 are each directed downward and are connected to the first 78, second 80 and third 82 lower conductive pathways, respectively. The second connector ends 108 terminate at the second connector 41.

When the circuit breaker 36 in device 30 is closed, current received from a main box flows through the first connector 38 to the first 94, second 96 and third 98 incoming bus layers, first 72, second 74 and third 76 upper conductive pathways, first 60, second 62 and third. 64 upper straps, circuit breaker 36, first 66, second 68 and third 70 lower straps, first 78, second 80 and third 82 lower conductive pathways, first 100, second 102, and third 104 outgoing bus layers, second connector 41 and to a bank of meter modules. When the circuit breaker 36 is opened, no current flows through the device 30. Thus, opening of the circuit breaker 36 causes the interruption of current flow within the cross bus 40 and not before or after the cross bus 40.

Figure 7:
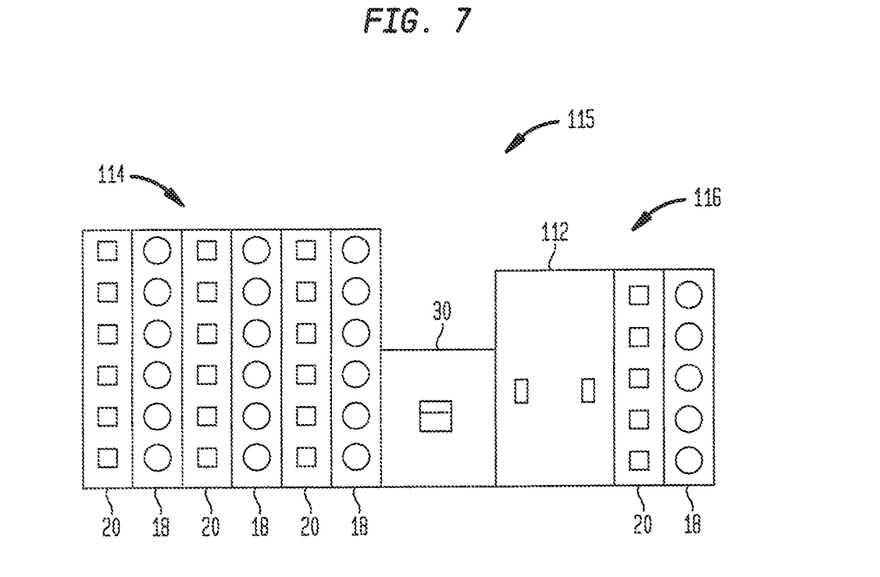
FIG. 7 depicts a modular metering arrangement in accordance with the invention.

Referring to FIG. 7, a modular metering arrangement 115 in accordance with present invention is shown. The arrangement 115 includes a main box 112 connected to an electrical power distribution system. The main box 112 provides power to first 114 and second 116 banks of meter modules that include one or more stacks of meter sockets 18. The first 114 and second 116 banks of modules are associated with a multi-family dwelling or other building having multiple units. Each meter socket 18 is electrically connected to a building unit and is adapted to receive a metering device used to determine how much electricity has been consumed in the associated building unit for billing purposes, for example. A circuit breaker is associated with each meter socket 18. Electrical power to individual building units may be connected or disconnected by closing or opening an associated circuit breaker by actuating an associated breaker handle 20.

The device 30 is connected to the main box 112 and the first bank of modules 114 via the first 38 and second 41 connectors, respectively. The main box 112 is also connected to the second bank of modules 116. When the circuit breaker 36 in device 30 is closed, current from the main box 112 flows through the device 30 from the first connector 38 to the second connector 41 as previously described and to the first bank of modules 114. Current front the main box 112 also flows to the second bank of modules 116. When the circuit breaker 36 is opened, current flow to the first bank of modules 114 is interrupted and the main box 112 is disconnected from the first bank of modules 114. Further, current flow to the second bank of modules 116 from the main box 112 is maintained when the circuit breaker 36 is opened. Therefore, power to an entire building is not cut off during activities which require that power to only certain areas of a building be disconnected, such as during maintenance operations. In addition, the arrangement 115 is in compliance with National Electrical Code® requirements which set forth that no more than six switches or circuit breakers shall be used to turn off all power to a building.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations.

What is claimed is:

1. A device for disconnecting electrical power from a first stack of meter modules, wherein the power is supplied by a main box that also supplies power to a second stack of meter modules, comprising:
    an incoming bus section for receiving power from the main box;
    an outgoing bus section for feeding power to the first stack of modules;
    a cross bus device connected to the incoming and outgoing bus sections; and
    a circuit breaker connected to the cross bus device, wherein when the circuit breaker is closed, power is supplied to the first and second stacks of modules and wherein when the circuit breaker is opened, power to the first stack of modules is disconnected while power to the second stack of modules is maintained.

2. The device according to claim 1, wherein the incoming bus section includes incoming first, second and third conductive layers and the outgoing bus section includes outgoing first, second and third conductive layers.

3. The device according to claim 2, wherein the incoming first, second and third conductive layers each include a first circuit breaker end and a first connector end.

4. The device according to claim 2, wherein the outgoing first, second and third conductive layers each include a second circuit breaker end and a second connector end.

5. The device according to claim 2, wherein the first, second and third conductive layers of the incoming and outgoing bus sections are fabricated from aluminum or copper.

6. The device according to claim 2, wherein the first, second and third conductive layers of the incoming and outgoing bus sections are approximately 3.5 in. by 0.25 in.

7. The device according to claim 1, wherein the circuit breaker includes three poles.

8. A cross bus for connecting a circuit breaker, an electrical distribution system and a stack of meter modules, comprising:
    a first plurality of conductive layers each having a first circuit breaker end connected to the circuit breaker and a first connector end connected to the electrical distribution system;

a second plurality of conductive layers each having a second circuit breaker end connected to the circuit breaker and a second connector end connected to the stack of meter modules.

9. The device according to claim 8, wherein the first and second plurality of conductive layers are each fabricated from aluminum or copper.

10. The device according to claim 2, wherein the first and second plurality of conductive layers are each approximately 3.5 in. by 0.25 in.

11. The device according to claim 1, wherein the first and second plurality of conductive layers each include three conductive layers.

12. A device for disconnecting electrical power from a first stack of meter modules, wherein the power is supplied by a main box that also supplies power to a second stack of meter modules, comprising:
   an incoming bus section for receiving power from the main box, wherein the incoming bus section includes incoming first, second and third conductive layers;
   an outgoing bus section for feeding power to the first stack of modules, wherein the outgoing bus section includes outgoing first, second and third conductive layers;
   a cross bus device connected to the incoming and outgoing bus sections; and
   a circuit breaker connected to the cross bus device, wherein when the circuit breaker is closed, power is supplied to the first and second stacks of modules and wherein when the circuit breaker is opened, power to the first stack of modules is disconnected white power to the second stack of modules is maintained.

13. The device according to claim 12, wherein the incoming first, second and third conductive layers each include a first circuit breaker end and a first connector end.

14. The device according to claim 13 further including first, second and third upper conductive pathways for connecting each first circuit breaker end to the circuit breaker.

15. The device according to claim 12, wherein the outgoing first, second and third conductive layers each include a second circuit breaker end and a second connector end.

16. The device according to claim 15 further including the first, second and third lower conductive pathways for connecting each second circuit breaker end to the circuit breaker.

17. The device according to claim 12, wherein the first, second and third conductive layers of the incoming and outgoing bus sections are fabricated from aluminum or copper.

18. The device according to claim 12, wherein the first, second and third conductive layers of the incoming and outgoing bus sections are approximately 3.5 in. by 0.25 in.

19. The device according to claim 12, wherein the circuit breaker includes three poles.

20. The device accord according to claim 12 further including a neutral conductive layer that bypasses the circuit breaker.

* * * * *